USO10944981B2

United States Patent
Mory et al.

(10) Patent No.: US 10,944,981 B2
(45) Date of Patent: Mar. 9, 2021

(54) METHOD FOR THE CONTEXTUAL COMPOSITION OF AN INTERMEDIATE VIDEO REPRESENTATION

(71) Applicant: Orange, Paris (FR)

(72) Inventors: Emmanuel Mory, Betton (FR); Patrice Houze, Rennes (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/097,421

(22) PCT Filed: Apr. 18, 2017

(86) PCT No.: PCT/FR2017/050919
§ 371 (c)(1),
(2) Date: Oct. 29, 2018

(87) PCT Pub. No.: WO2017/187044
PCT Pub. Date: Nov. 2, 2017

(65) Prior Publication Data
US 2019/0158863 A1 May 23, 2019

(30) Foreign Application Priority Data
Apr. 29, 2016 (FR) ...................................... 1653869

(51) Int. Cl.
*H04N 19/46* (2014.01)
*H04N 21/442* (2011.01)
(Continued)

(52) U.S. Cl.
CPC ........... *H04N 19/46* (2014.11); *H04L 65/601* (2013.01); *H04L 65/80* (2013.01); *H04N 19/119* (2014.11);
(Continued)

(58) Field of Classification Search
CPC ............. H04N 19/46; H04N 21/23439; H04N 21/4223; H04N 21/44218; H04N 21/2402;
(Continued)

(56) References Cited

U.S. PATENT DOCUMENTS

2009/0118018 A1\* 5/2009 Perlman ................ H04L 47/283
463/42
2014/0307775 A1 10/2014 Ouedraogo et al.
(Continued)

FOREIGN PATENT DOCUMENTS

WO 2013036237 A1 3/2013

OTHER PUBLICATIONS

International Search Report dated May 31, 2017 for corresponding International Application No. PCT/FR2017/050919, filed Apr. 18, 2017.
(Continued)

*Primary Examiner* — Tracy Y. Li
(74) *Attorney, Agent, or Firm* — David D. Brush; Westman, Champlin & Koehler, P.A.

(57) ABSTRACT

A method for composing an intermediate representation of a video sequence from at least two representations of the video sequence of different quality, spatially partitioned into a plurality of tiles, each tile being associated with compressed data in the representation. The tiles can be decoded independently of each other and, at a given time, the different representations are identically partitioned. When the sequence is being played on a playback device, the method includes: obtaining a context data item representing the activity of viewers located near the playback device; selecting, on the basis of the context data item obtained and at least one maximum rate criterion for the intermediate representation resulting from the composition, a set of tiles
(Continued)

forming a partition of the sequence from the at least two representations; and composing an intermediate representation of the video sequence from the compressed data associated with the selected set of tiles.

8 Claims, 7 Drawing Sheets

(51) Int. Cl.
*H04N 21/4728* (2011.01)
*H04N 21/24* (2011.01)
*H04N 21/4223* (2011.01)
*H04N 21/2343* (2011.01)
*H04N 19/119* (2014.01)
*H04N 19/167* (2014.01)
*H04N 19/44* (2014.01)
*H04L 29/06* (2006.01)

(52) U.S. Cl.
CPC ........... *H04N 19/167* (2014.11); *H04N 19/44* (2014.11); *H04N 21/23439* (2013.01); *H04N 21/2402* (2013.01); *H04N 21/4223* (2013.01); *H04N 21/44209* (2013.01); *H04N 21/44218* (2013.01); *H04N 21/4728* (2013.01)

(58) Field of Classification Search
CPC ......... H04N 21/4728; H04N 21/44209; H04N 19/44; H04N 19/167; H04N 19/119; H04L 65/80; H04L 65/601
See application file for complete search history.

(56) References Cited

U.S. PATENT DOCUMENTS

| | | | |
|---|---|---|---|
| 2014/0321555 A1* | 10/2014 | Rossato | H04N 19/46 |
| | | | 375/240.26 |
| 2015/0015789 A1 | 1/2015 | Guntur et al. | |
| 2015/0106868 A1* | 4/2015 | Lo | G06F 21/32 |
| | | | 726/1 |

OTHER PUBLICATIONS

Written Opinion of the International Searching Authority dated May 31, 2017 for corresponding International Application No. PCT/FR2017/050919, filed Apr. 18, 2017.

Masayuki Inoue et al. "Interactive Panoramic Video Streaming System over Restricted Bandwidth Network". Proceedings of the International Conference on Multimedia, MM '10. Jan. 1, 2010. New York, New York.

"Series H: Audiovisual and Multimedia Systems: Infrastructure of audiovisual services—Coding of moving video: High efficiency video coding." International Telecommunication Union, ITU-T: Telecommunication Standardization Sector of ITU, H.265. Oct. 2014.

"Information technology—Dynamic adaptive streaming over HTTP (DASH)—Part 1: Media presentation description and segment formats." International standard, ISO/IEC 23009-1, draft third edition. Jan. 9, 2017.

English Translation of Written Opinion of the International Searching Authority dated Jun. 14, 2017 for corresponding International Application No. PCT/FR2017/050919, filed Apr. 18, 2017.

* cited by examiner

METHOD FOR THE CONTEXTUAL COMPOSITION OF AN INTERMEDIATE VIDEO REPRESENTATION

CROSS-REFERENCE TO RELATED APPLICATIONS

This Application is a Section 371 National Stage Application of International Application No. PCT/FR2017/050919, filed Apr. 18, 2017, which is incorporated by reference in its entirety and published as WO 2017/187044 A1 on Nov. 2, 2017, not in English.

TECHNICAL FIELD

The subject of the present invention lies in the field of digital video coding and more specifically in the field of video compression.

STATE OF THE ART

Internet access technologies now make it possible to view a high-quality video sequence without first downloading the complete sequence. To this end, video decoders implement continuous reading techniques, called video "streaming" techniques, whereby the data packets are downloaded at a rate corresponding to the bit rate of the encoded video. The decoding and playback of a video frame can thus be performed in parallel with the downloading of the subsequent frames.

The drawback with this solution is that it is not possible to adapt to the quality of the connection of the user. Thus, it is often necessary for the broadcaster to offer, for the same video sequence, several versions encoded at different bit rates in order for the video players of the users to be able to choose a version compatible with the connection.

The modern video transport standards such as MPEG-DASH (Dynamic Adaptative Streaming over HTTP) provide for the video streams to be subdivided into a plurality of segments, each of the segments being available in different versions encoded at different bit rates. Thus, while one segment is being read by an MPEG-DASH client, the client automatically selects the next segment from the different versions available according to the network conditions detected. The choice of the version best suited to the network conditions is thus made automatically by the MPEG-DASH client, transparently to the user.

Despite all the advantages of this solution, the choice remains limited to the versions made available by the broadcaster and is not always optimal for the user. For example, if a video sequence is available in two versions, the first version being encoded at 4 MB/s and the second version being encoded at 1 MB/s, a user having a 3.5 MB/s connection will have to accept the low-quality version. Thus, to offer the best quality to their users, the broadcasters have to host numerous versions of one and the same content. Unfortunately, the coding and the storage of the different versions require a significant infrastructure which has a not-inconsiderable cost for the broadcasters, even though some versions will be invoked very little by the users.

Another approach for handling the adaptation to the bandwidth of the network consists in using a scalable coding. Scalability is the possibility of being able to offer a coded video stream with different quality levels. The signal is coded in a single binary stream so as to offer the possibility of decoding base stream and so-called enhancement streams whose quality increases successively. The scalability can be implemented according to different, spatial, temporal or quality-related, modalities. When a spatial scalability is implemented, the enhancement streams make it possible to improve the resolution of the content. A temporal scalability makes it possible to offer several temporal frequencies of the signal, the enhancement streams making it possible to progressively increase the frequency of the images of a decoded video stream. Finally, the scalability in terms of quality (or SNR, signal-to-noise ratio) makes it possible to improve the quality reducing the quantization distortion between the original image and the reconstructed image. These different modalities can be used jointly or independently of one another.

Scalability therefore allows for a fine adaptation of the quality of a video sequence to the bandwidth available. However, these techniques incur a significant coding and decoding complexity and require a bandwidth overhead of the order of 20%, which is often counter-productive compared to a multiple bit-rate coding as described previously.

There is therefore a need for an adaptive streaming solution which is capable of being adapted optimally to the bandwidth available, which does not require numerous versions of one and the same content to be hosted and which does not cause increased bandwidth consumption, while retaining the quality perceived by the viewers.

SUMMARY OF THE INVENTION

To this end, the invention relates to a method for composing an intermediate representation of a video sequence from at least two different representations of quality of said video sequence, said at least two representations being spatially partitioned into a plurality of tiles, each tile being associated with compressed data in said representation, the method being such that the tiles can be decoded independently of one another and that, at a given instant, the different representations are partitioned identically, the method comprising, when the sequence is being played back on a playback device, steps of obtaining of a context datum representative of the activity of viewers situated in proximity to the playback device, of selection, according to the context datum obtained, and at least one criterion of maximum bit rate of the intermediate representation resulting from the composition, of a set of tiles forming a partition of the sequence, originating from the at least two representations, and of composition of an intermediate representation of the video sequence from the compressed data associated with the selected set of tiles.

The invention thus makes it possible to compose a new intermediate representation from at least two different representations of one and the same sequence, without requiring the encoding or the storage of the composed representation. To this end, the images corresponding to one and the same instant in the different representations are partitioned identically and into a plurality of tiles so that, at each instant, the partitioning of an image in one representation corresponds to the partitioning of the corresponding image in the other representations.

Advantageously, the method uses a datum representative of the activity of the viewers in proximity to the playback terminal in order to determine tiles which must be selected in a representation of good quality. Such a context datum can be obtained by an analysis of images captured by a sensor associated with the playback terminal in order to detect the presence of viewers and follow their gaze. The method thus makes it possible to select tiles of good quality for a zone of the screen observed by a viewer and thereby enhances the perceived quality.

The datum representative of the activity of the viewers in proximity to the playback terminal can relate to at least one location observed by at least one viewer. Such locations can be determined from known gaze tracking algorithms. The quality can thus be enhanced in the zone of the screen observed by a viewer.

The datum representative of the activity of the viewers can also comprise an item of information on a movement of the user relative to the playback device. For example, when a viewer moves sideways, the viewing angle changes and tiles of quality can be selected for the zone of the sequence closest to the user.

The datum representative of the activity of the viewers can also correspond to the distance between at least one viewer and the screen on which the sequence is played back. The quality can thus be adapted according to the distance between the screen and a viewer so as to increase, for example, the resolution of the image when the viewer is close to the screen and reduce it when the viewer moves away from it.

The term tile corresponds here to a rectangular region defined spatially for an image or a group of images. In the context of the invention, the images that make up the video sequence are partitioned into tiles, the tiles being encoded in such a way that they can be decoded independently of one another. For example, the HEVC video coding standard (ISO/IEC 23008-2 MPEG-H Part and ITU-T H.265) defines the concept of tiles to allow for the parallelization of the encoding and decoding processes and offers the tools needed for video encoding such that the tiles can be decoded independently of one another. For example, the images can be partitioned according to a regular grid of 8×8 tiles. According to another example, the partitioning can be irregular and comprise tiles of large size at the top and at the bottom of the screen, such as, for example, tiles of the same width as the image and of a height equal to ¼ of the height of the image, and a set of tiles of small size at the center of the image. Such a disposition makes it possible to more finely adapt the quality in the central zone of the image.

The intermediate representation is thus composed of tiles that can be decoded independently and derived from at least two of the available representations. By adjusting the number of tiles originating from one and the other of the two representations, it is possible to obtain different variants of the intermediate representation, without the overhead incurred by the conventional scalability techniques. Also, contrary to the conventional multiple bit-rate encoding techniques, this new representation does not occupy additional space on the broadcast servers. The method can thus allow a video streaming system to optimally adapt the video stream to the bandwidth available without requiring numerous versions of one and the same content to be hosted and without causing increased bandwidth consumption.

Thus, the tiles are selected as a function of at least one point observed by at least one user, and according to the different representations and the available bandwidth. According to a quality criterion, for example according to their encoding bit rate, in one or other of the different representations. The composition method thus makes it possible to strategically select tiles from different available representations so as to compose a stream whose bit rate does not exceed a limit set previously to correspond for example to the bandwidth available on the network. The method thus makes it possible to restrict the particular representation to a maximum bit rate. For example, the maximum bit rate criterion can be defined by a measurement of the bandwidth available between the playback terminal and a broadcast server or estimated from the level of filling of a buffer memory of a video stream decoding device. The method is thus capable of composing a representation whose bit rate is optimal in light of the network conditions.

According to another particular embodiment, the method is such that it further comprises steps of:
computation of the resulting bit rate of the intermediate representation,
checking that the resulting bit rate does not exceed a predetermined threshold, and
selection of a new set of tiles when the resulting bit rate is above the predetermined threshold.

Thus, when the representations from which a new representation is composed are respectively encoded at a first bit rate and at a second bit rate, the method advantageously makes it possible to obtain a representation whose bit rate lies between that of the first representation and that of the second representation. By varying the number of tiles derived from one and the other of the representations, the method makes it possible to offer representations at different bit rates in order to finely adapt the bit rate of the video stream to the bandwidth available.

According to a particular embodiment, the intermediate representation is composed on demand, as the decoding proceeds. The proportion of tiles originating from one or the other of the representations to compose the intermediate representation can then vary over time as a function of the bandwidth available on the connection. The method thus makes it possible to adjust the quality of the representation according to the bandwidth available at a given instant.

According to a particular embodiment, the method is such that the context datum comprises an indication relating to the fact that a new viewer is in proximity to the terminal, and that the selection step comprises the selection of tiles in the representation of highest quality for the central part of the image.

The method thus makes it possible to adapt the spatial arrangement of the tiles of good and less good quality according to whether a new viewer is in proximity to the playback terminal. For example, the method can select tiles of quality at the center of the video when a new viewer is detected. Such a disposition enhances the quality perceived by the user because it has been shown that when a user arrives close to a screen, his or her gaze goes first to the center of the screen.

The method can also comprise, according to another particular embodiment, a preliminary step of obtaining an information item relating to the bandwidth available on the network.

According to a particular embodiment, the method is such that the context datum comprises an indication relating to the fact that no viewer is in proximity to the terminal, and that the selection step comprises the selection of a minimum of tiles in the representation of highest quality.

In this way, the method makes it possible to reduce the quality of the video when no viewer is in proximity to the playback terminal.

According to a particular embodiment, the method is such that the context datum comprises an indication relating to a location on the image, the location corresponding to a zone of the screen of a terminal observed by at least one viewer and the selection step comprises the selection of tiles in the representation of highest quality for the part of the image corresponding to the indicated location.

A gaze tracking device is for example associated with the playback terminal and makes it possible to obtain the coordinates of a zone or of a point on the screen of the playback terminal towards which a viewer directs his or her gaze. When the context datum comprises such an item of information, tiles of good quality can be selected for the locations observed by a viewer. Such a disposition makes it possible to enhance the quality perceived by the viewer, while reducing the bit rate of the composed intermediate representation.

The invention is also advantageous when the video sequence is a panoramic video played back via a 360° viewing device such as virtual headset worn by a user. In this configuration, only the part of the image corresponding to the orientation and to the field of view of the user is played back in the headset. However, the different images that make up the sequence are downloaded in full in order to offer a fluid user experience when he or she abruptly changes orientation. The method makes it possible to enhance the user experience in this particular case.

The indication relating to a location on the image corresponds in this case to the orientation of the user relative to an initial position. It can for example be the value of an angle of rotation relative to an initial orientation of the user along one or more axes. The orientation of the user can be determined by means of sensors such as accelerometers, gyroscopes or a compass incorporated in the virtual headset. The method thus makes it possible to compose a video of sequence in which tiles of good quality are selected for the zone of the image displayed in the headset while tiles of less good quality are selected for the zones of the video which are outside of the field of view of the user wearing the headset. It is thus possible to enhance the user experience by reserving the greater part of the bandwidth for the part of the video sequence which is actually visible to the user.

According to a particular embodiment, the context datum also comprises the duration of looking intently at a particular location of the image.

The gaze tracking device associated with the terminal can also measure the time for which a user looks intently at a point of the image. When the measured time of looking intently exceeds a predetermined threshold, such as 4 seconds for example, it is possible to predict that the user will begin to move the gaze over the rest of the image. Tiles of good quality can then be selected at other locations of the image.

According to a particular embodiment, the method is such that the selection of a tile is made according to at least one criterion for selection of at least one adjacent tile.

The method thus makes it possible to ensure that tiles that are adjacent in the composed stream do not exhibit a significant quality difference. For example, when an intermediate representation is composed from three pre-encoded representations of different quality, the method can avoid having a tile originating from the representation of the lowest quality adjacent to a tile originating from the representation of the highest quality. The method thus makes it possible to effect a smoothing making the quality differences of contiguous tiles less noticeable.

The invention relates also to a method for downloading an intermediate representation on a terminal such that it comprises steps of reading of an indication representative of the capacity of a server to compose an intermediate representation of a video sequence, of determination of a context datum representative of the activity of at least one viewer situated in proximity to the playback device, of transmission of the determined context datum and of receipt of an intermediate representation composed in accordance with the composition method according to the datum transmitted.

For example, a decoding terminal which wants to download content can determine whether the server is capable of supplying it with a representation adapted to its network connection. If the server indicates that it has the capacity to compose an intermediate representation, the terminal can determine a context datum representative of the activity of viewers. For example, the terminal can determine such a context datum from a sensor of camera type associated with a processing unit configured to analyze the images captured and detect the arrival and the departure of viewers, or track their gaze to determine zones of the screen that are observed. The method thus allows a broadcast server or a terminal implementing the method to compose an intermediate representation of a video sequence, the quality of which perceived by the viewer is optimal.

According to a particular representation, the downloading method is such that the context datum comprises an indication relating to the fact that a new viewer is in proximity to the terminal.

When a viewer arrives in proximity to a playback terminal such as a television, his or her gaze goes generally to the center of the screen. Thus, the method provides for determining a context datum relating to the fact that a new viewer is in proximity to the terminal, this datum making it possible to select tiles of good quality at the center of the image and tiles of less good quality around the edges. The arrival of a new viewer can for example be detected by a face detection or facial recognition system.

According to a particular embodiment, the context datum comprises an indication relating to the fact that no viewer is in proximity to the terminal.

Such a disposition allows for the composition of a representation of low quality when no viewer is in proximity to the playback terminal. In this way, the bandwidth used is reduced without affecting the quality perceived by the viewers. This participates in reducing the energy consumption linked to the broadcasting of a content when no one is watching it.

According to a particular embodiment, the context datum comprises an indication relating to a location on the image, the location corresponding to a zone of the screen of the terminal observed by at least one viewer.

The use of gaze tracking techniques allows for the determination of a zone of the screen observed by a viewer. Such a context information item allows for the composition of a representation in which the tiles of higher quality are arranged at the point where the viewer directs his or her gaze.

The invention relates also to a device for composing an intermediate representation of a video sequence from at least two different representations of quality of said video sequence, said at least two representations being spatially partitioned into a plurality of tiles, each tile being associated with compressed data in said representation, the device being characterized in that the tiles can be decoded independently of one another and in that, at a given instant, the different representations are partitioned identically, the device comprising modules for:

obtaining of a context datum representative of the activity of viewers situated in proximity to the playback device, selection, according to the context datum obtained and at least one criterion of maximum bit rate of the intermediate representation resulting from the composition, of a set of tiles forming a partition of the sequence, originating from the at least two representations, and composing an intermediate representation of the video sequence from the compressed data associated with the selected set of tiles.

The invention relates also to a server comprising a composition device as described above.

The invention relates also to a terminal comprising a composition device as described above.

According to another aspect, the invention relates also to a device for downloading an intermediate representation such that it comprises:
- a unit for reading an indication representative of the capacity of a server to compose an intermediate representation of a video sequence,
- capture means configured to obtain a contextual datum relating to the activity of viewers in proximity to a playback terminal,
- communication means capable of transmitting a tile selection criterion, and of receiving an intermediate representation composed according to the transmitted selection criterion and in accordance with the composition method described.

According to a particular embodiment, the invention relates to a decoding terminal comprising a device for downloading an intermediate representation.

The invention relates also to a computer program comprising instructions for executing the steps of the composition method and/or for executing the steps of the downloading method, when said program is run by a processor.

Finally, the invention relates to a processor-readable information medium on which is stored a computer program comprising instructions for executing the steps of the method of and/or instructions for executing the downloading method.

The information medium can be any entity or device capable of storing the program. For example, the medium can comprise a storage means, such as a ROM, for example a CD ROM or a microelectronic circuit ROM, or else a magnetic storage means, for example a diskette (floppy disk) or a hard disk. Also, the information medium can be a transmissible medium such as an electrical or optical signal, which can be routed via an electrical or optical cable, wirelessly or by other means. The program according to the invention can in particular be downloaded over a network of Internet type. Alternatively, the information medium can be an integrated circuit in which the program is incorporated, the circuit being suitable for executing or for use in the execution of the method concerned.

The various embodiments or implementation features mentioned above can be added, independently or in combination with one another, to the steps of the composition method and/or of the downloading method as defined above.

The servers, devices and programs offer at least advantages similar to those conferred by the composition method described above.

LIST OF FIGURES

Other features and advantages of the invention will become more clearly apparent on reading the following description of a particular embodiment, given merely as an illustrative and nonlimiting example, and the attached drawings, in which.

DETAILED DESCRIPTION OF AN EMBODIMENT

Figure 1:
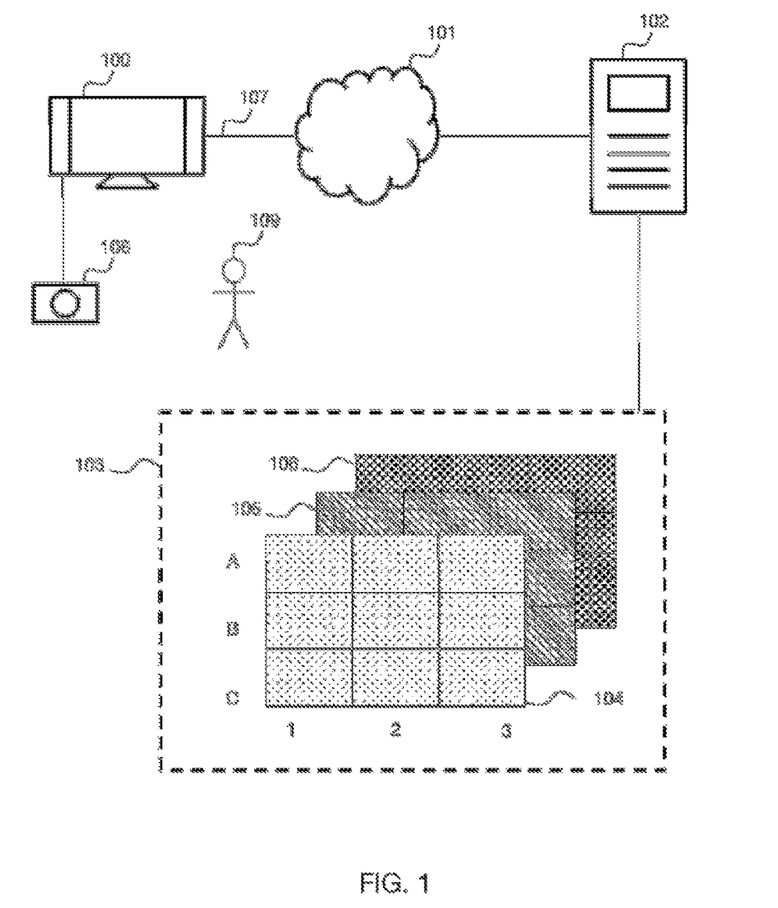
FIG. 1 represents a simplified network architecture suitable for implementing the invention according to a particular embodiment.

FIG. 1 represents a simplified architecture in which the composition method according to the invention is implemented.

Such an architecture comprises a client terminal 100 suitable for playing back an audiovisual sequence, a communication network 101 and a content broadcast server 102. The content broadcast server 102 is suitable for supplying content to the terminal 100 via the network 101 which can for example be a network of IP (Internet Protocol) type. The terminal 100 is connected to the network 101 via a link 107. The architecture also comprises a device 108 associated with the terminal 100 and suitable for detecting a sequence viewing context. This is, for example, a video camera, an infrared camera or any other sensor suitable for determining the presence of viewers and their activity. For example, the device 108 can capture images of the environment and perform processing operations on these images in order to determine a sequence viewing context. In particular, the device 108 captures images of one or more viewers 109 in proximity to the terminal 100 in order to determine their number and their attitude.

In this example, the broadcast server makes audiovisual content 103 available to the terminal 100. The server 102 hosts different representations of the content, each of the representations being available according to a particular encoding profile. For example, the audiovisual content 103 has been encoded previously in a first representation 104 coded at 500 KB/s, a second representation 105 coded at 2 MB/s and a third representation 106 coded at 4 MB/s. In this way, the server 102 can supply the terminal 100 with a version of the audiovisual content suited to the bandwidth that it has available. For example, if the connection 107 allows a maximum bit rate of 1 MB/s, the server 102 will be able to supply it with the 500 KB/s representation so as to guarantee quality of service. Conventionally, the different representations available for the content 103 are announced in a manifest file that can be downloaded by the terminal 100 in order for the latter to be able to request the supply of the most suitable representation.

In the example presented here to illustrate the invention, the streaming architecture is based on the use of the HTTP (HyperText Transport Protocol) protocol and implements the MPEG-DASH (Dynamic Adaptative Streaming over HTTP) standard. This is the ISO/IEC 23009-1:2012(E) standard dedicated to the streaming of multimedia content over the Internet. The coding of the video content is here performed according to the HEVC (High Efficiency Video Coding, ISO/IEC 23008-2 MPEG-H Part 2 and ITU-T H.265) standard.

During the encoding of the different representations, the video encoder has been configured appropriately for the images which make up the sequence to be divided into rectangular regions called "tiles" forming a partition of the images according to a predefined grid. The partition of the images into tiles is an option offered for example by the HEVC standard in order to allow a parallelization of the encoding and decoding processes on multicore and/or multiprocessor computing architectures. For example, the video sequence can be partitioned into tiles according to the method described in the patent application US2014307775 "METHOD AND DEVICE FOR PARTITIONING AN IMAGE".

For example, to guarantee an independence of the tiles during the decoding, the motion vectors are confined within the tiles. Thus, the decoding of one tile does not require information contained in another tile. Also, to avoid the propagation of information from one tile to the other upon the application of "in-loop" filters such as the "deblocking filter" or the "sample adaptative offset filter", these filters are deactivated at the boundaries of the tiles by setting the "loop_filter_across_tiles_enabled_flag" parameter to zero in the PPS (Picture Parameter Set). According to the HEVC standard, the tiles are defined in the PPS (Picture Parameter Set). The PPS contains elements which specify the number of tiles in rows and of columns in an image, as well as their size. An HEVC video sequence is divided into different data segments which contain, in particular, the data of the tiles and the location of these data in the segment. A segment header comprises information on the content and the parameters of the segment, and in particular data making it possible to access the data of the tiles.

Figure 2A:
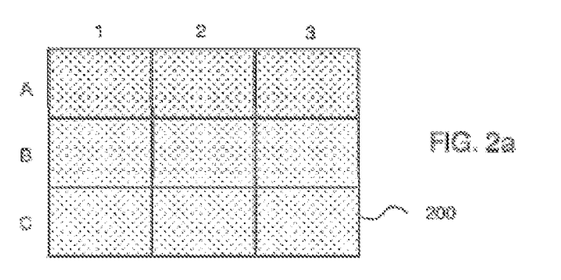
FIGS. 2a, 2b and 2c represent an example of composition of a video stream from two representations of one and the same stream offering a different image quality.
Figure 2B:
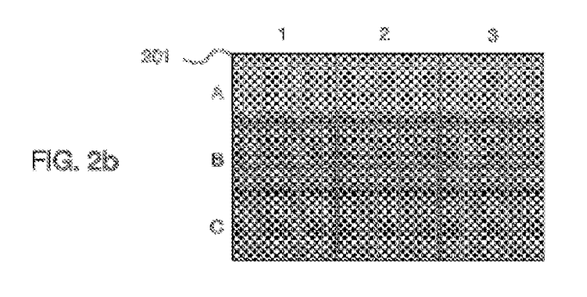

FIGS. 2a and 2b illustrate an example of partitioning of a video sequence. FIG. 2a illustrates a first low-quality representation 200 of a video sequence. The images of this sequence are divided into 9 tiles according to a grid of 3 rows and 3 columns. FIG. 2b illustrates a second representation 201 of the same sequence, encoded in high quality. The images corresponding to the same instant in the representation 200 and the representation 201 are partitioned identically. These representations have been encoded with the precautions described above so that the tiles can be decoded independently of one another. For example, the tile C2 of the representation 200 does not include any reference to information contained in the adjacent tiles and can be decoded independently of the other tiles of the image. On the other hand, this tile C2 can include references to this same tile C2 in the preceding or subsequent images, when they form part of the same GOP (Group Of Pictures).

Figure 3:
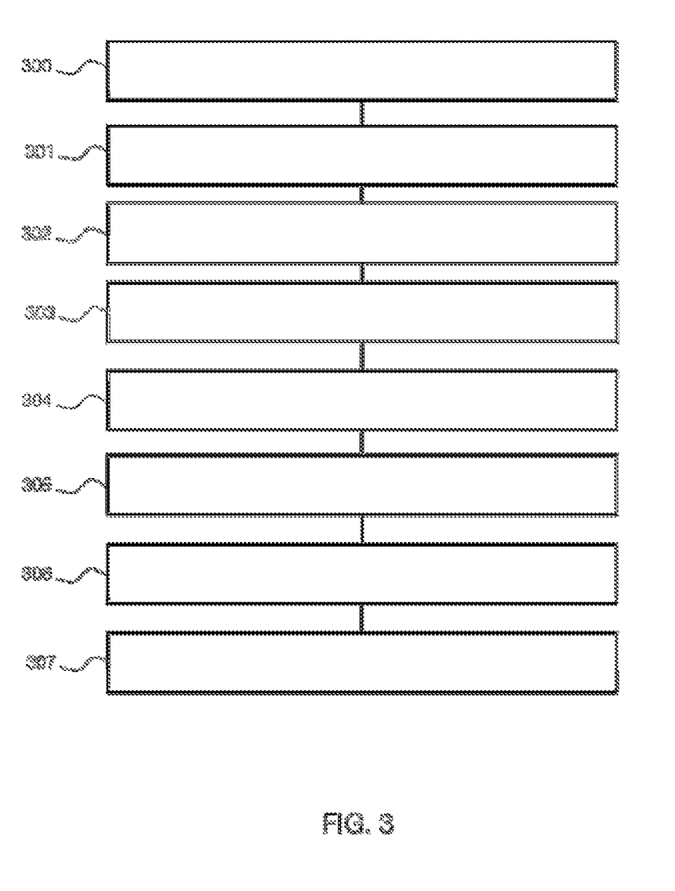
FIG. 3 illustrates the main steps of the composition method according to a particular embodiment.

Reference is now made to FIG. 3 which illustrates the main steps of the composition method according to a particular embodiment in which the method is implemented on the server 102.

During a preliminary step 300, a video sequence is encoded according to the HEVC standard, according to different encoding profiles. The video encoder is configured so as to partition the images into tiles that can be decoded independently of one another as described above. The configuration of the tiles in the different representations is identical for a given instant. The different representations of the sequence are made available to the users on a server, each representation being accessible through a particular URL (Uniform Resource Locator). The different representations available and their features are consigned to an MPD (Media Presentation Description) file. For example, the MPD file (also called "manifest") can comprise, for each of the representations available, URLs for accessing the different segments of a representation, the encoding bit rate, the video resolution, an index of the segments, etc. A representation is for example declared as follows in a manifest file according to the DASH standard:

<Representation id="1" bandwidth="4000000" width="1280" height="720">
  <SegmentList duration='3600'>
    <SegmentURL media=http://orange.com/movie1.mp4'/>
  </SegmentList>
</Representation>

In the step 301, the server receives a manifest file download request. The request originates from a terminal such as, for example, the terminal 100 of FIG. 1 whose connection 107 is limited to 1 MB/s.

During the step 302, the server transmits to the terminal a manifest file describing the representations available for a video sequence. This file also includes an indication representative of the capacity of the server to compose an intermediate representation of the video sequence. Thus, the decoding terminal 100 can determine, on receipt of the manifest file, that the server is capable of generating intermediate representations of the sequence. To this end, the server can indicate a particular parameter in the declaration of a representation. For example, for this purpose, the following declaration uses the particular value "custom" in the "bandwidth" attribute:

<Representation id="1" bandwidth="custom" width="1280" height="720">
  <SegmentList duration='3600'>
    <SegmentURL media=http://orange.com/movie2.mp4'/>
  </SegmentList>
</Representation>

This indication can also be communicated by other means, such as, for example, by using a parameter, a value or a particular attribute in the header of the manifest file.

On receipt of the manifest, the terminal 100 can then request an optimal representation given the sequence viewing context and of at least one criterion of maximum bit rate of the intermediate representation resulting from the composition. To this end, it can send a download request to the URL indicated in the manifest, the request comprising in particular a context datum representative of the activity of viewers situated in proximity to the playback device and, according to a particular embodiment of the invention, and an indication of the maximum bit rate desired for the representation. The request comprises a criterion for obtaining an intermediate representation which can be a criterion of desired quality or, in the example described here, a criterion of maximum bit rate desired. The contextual datum is, for example, communicated periodically to the server via a parameter of an http request.

The context datum is representative of the activity of viewers situated in proximity to the playback device. For example, the context datum received by the server 102 can contain:

an indication according to which a new viewer 109 is situated in proximity to the terminal 100,
  an indication according to which a viewer 109 is no longer detected in proximity to the terminal 100,
  an indication according to which the gaze of a viewer 109 is directed toward a particular zone of the screen of the terminal 100. For example, such an indication can comprise the coordinates of a point or of a zone of the image toward which the gaze of at least one viewer is directed. In case of a plurality of the viewers, a plurality of points or of zones can be transmitted.

According to a particular embodiment, the context datum is send with, in addition, an indication of maximum bit rate required of the intermediate representation resulting from the composition. For example, the terminal 100 can indicate that it wants to download an intermediate representation whose bit rate does not exceed the bandwidth of the link 107, that is to say 1 MB/s.

Thus, the server receives, in the step 303, a request for access to the content comprising at least one context datum relating to the activity of at least one viewer.

In the step 304, the server 102 obtains a maximum video bit rate desired by the decoding terminal. From this bit rate information, the server selects, from the pre-encoded representations that it has available, a first pre-encoded representation suited to the context of viewing of the video sequence, and whose bit rate is below the maximum bit rate indicated by the terminal and a second pre-encoded representation whose bit rate is above the maximum bit rate indicated by the terminal. For example, on receipt of a request indicating a maximum bit rate of 1 MB/s, the server 102 selects a first representation 104 encoded at 500 KB/s and a second representation 105 encoded at 2 MB/s.

In a step 305, the server selects a set of tiles forming a partition of the images of the sequence and made up of tiles originating from the first representation and the second representation, each tile being associated with compressed data in said representation, in order to obtain an intermediate representation suited to the context of viewing of the video sequence, and whose bit rate lies between the encoding bit rate of the first representation and the encoding bit rate of the second representation. For that, the server 102 uses the context datum representative of the activity of viewers situated in proximity to the playback device obtained to select a tile in one or other of the representations selected in the step 304.

Figure 4A:
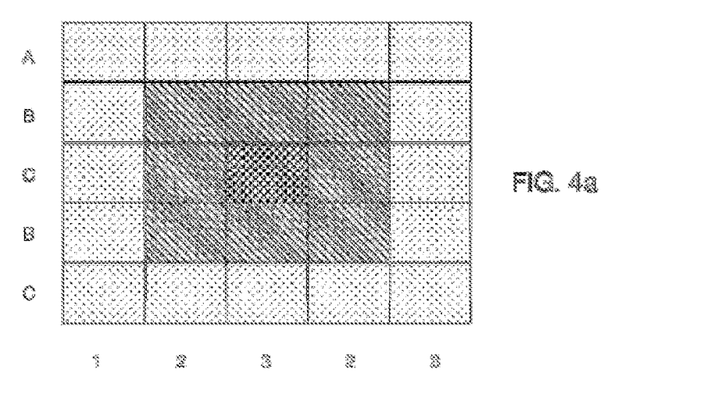
FIGS. 4a and 4b represent, as examples, two ways of arranging tiles originating from different representations.

For example, when the context datum comprises an indication relating to the fact that a new viewer is in proximity to the terminal the server can select tiles in one or other of the representations selected so that tiles of high quality are situated at the center of the video and tiles of less good quality are situated around the edges of the video. Such an arrangement of tiles is for example represented in FIG. 4a. Such a disposition is particularly advantageous when a new viewer is detected because it has been observed that when a person arrives in proximity to a screen on which a video is played back, his or her gaze goes firstly to the center of the video.

According to another example, when the context datum comprises an indication relating to the fact that no viewer is in proximity to the terminal, the server can select tiles from the representations of low quality. Such a disposition makes it possible to reduce the bit rate of the video sequence transmitted when no viewer is located in front of the playback terminal.

Figure 4B:
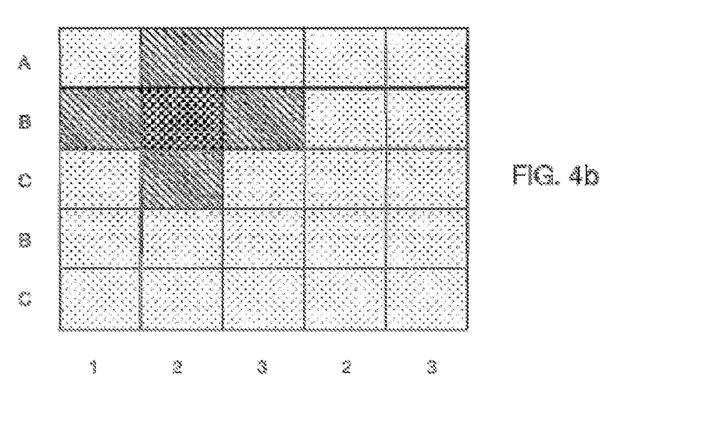

According to yet another example, when the context datum comprises an indication relating to a location observed by at least one viewer on the screen of the terminal, the server 102 can select tiles corresponding to the location observed in a representation of high quality and select tiles corresponding to the other locations in a representation of low quality. Referring to FIG. 4b, the method thus makes it possible to ensure a good video quality at the point where a viewer directs his or her gaze when the context datum comprises an indication according to which a viewer observes the zone B2 of the screen.

Figure 2C:
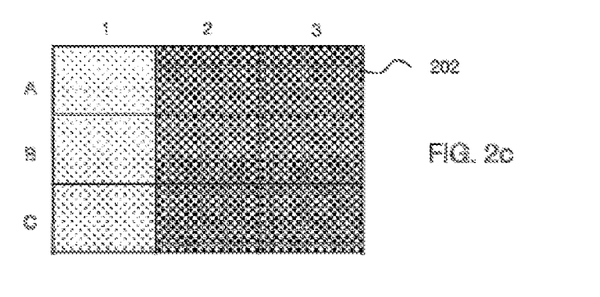

According to a particular embodiment, from a first representation 200 illustrated in FIG. 2a and from a second representation 201 illustrated in FIG. 2b, the server can compose an intermediate representation 202 illustrated in FIG. 2c from the compressed data associated with the selected set of tiles. FIG. 2c is thus made up of a set of tiles {A1, B1, C1} derived from the first representation 200 and of a set of tiles {A2, B2, C2, A3, B3, C3} derived from the second representation 201. The bit rate of the representation 202 thus lies between the bit rate of the first representation 200 and that of the second representation 201. Such a selection can be made following the obtaining of an indication relating to the fact that a viewer observes the right-hand part of the screen. It is thus possible to limit the bandwidth required for the transmission of the video sequence while preserving the quality perceived by the viewer.

At this stage, according to a particular embodiment, the server can compute the bit rate of the composed representation so as to compare it with the maximum bit rate indicated by the decoding terminal. Thus, if the bit rate of the composed intermediate representation is above the maximum bit rate indicated by the decoding terminal, the server can select a new set of tiles from the representations, the new set comprising a greater share of tiles originating from the representation whose bit rate is below the bit rate indicated by the terminal. Thus, after a certain number of iterations, the server can obtain an intermediate representation whose bit rate is optimal in light of the constraint set by the decoding terminal.

According to another particular embodiment, the set of tiles initially selected can comprise all the tiles of a representation apart from one tile the location of which is determined and request to the received contextual datum, and in particular with respect to the indication relating to the activity of at least one viewer, the tiles of another representation being added one by one on each iteration, as long as the bit rate of the composition is not optimal in light of the limit set by the terminal. For example, a first set of tiles can consist of the tiles {B1, C1, A2, B2, C2, A3, B3, C3} originating from the high-quality representation 201 of FIG. 2b and of the single tile {A1} originating from the representation 200. If the bit rate of the resulting composition is above the threshold set by the terminal, the server modifies the first set and the second set so as to replace a high-quality tile with a low-quality tile. To this end, the first set can comprise the tiles {C1, A2, B2, C2, A3, B3, C3} derived from the representation 201 and the second set the tiles {A1, B1} derived from the second set. The steps are thus repeated until the bit rate of the resulting composition is below or equal to the maximum bit rate set.

According to a particular embodiment, a tile is selected according to the selection made for adjacent tiles. For example, when an intermediate representation is composed from compressed data associated with the tiles originating from the three pre-encoded representations 104, 105 and 106 illustrated in FIG. 1, it may be that a first tile is selected in the low-quality representation 104 and that a tile adjacent to this first tile is selected in the high-quality representation 106. The fact that these tiles of very different quality are contiguous poses a problem of uniformity of the composed image and can be prejudicial to the quality perceived by the user. To avoid that, the method proposes selecting a tile in a particular representation according to the choices made for the adjacent tiles. For example, FIG. 4b illustrates an intermediate representation composed from tiles derived from the pre-encoded representations 104, 105 and 106 described with reference to FIG. 1. A high-quality tile has been selected in the position B2, at the center of the image. This is, for example, a location observed by a spectator. The adjacent tiles A2, B1, C2 and B3 are then selected in the medium-quality representation 105, the tiles A1, C1, A3 and C3 being selected in the low-quality representation 104. In this way, the method can limit the quality differences at the tile edges.

In the step 306, when a set of tiles that satisfies the criterion of maximum bit rate of the representation is selected, the server can extract the corresponding data when they are requested by the decoding terminal. The data corresponding to a particular tile of a representation can be obtained for example according to the method described in the patent application US2014307775 "METHOD AND DEVICE FOR PARTITIONING AN IMAGE". From the data of the tiles, each coded image is reconstructed then transmitted to the decoding terminal in a step 307.

According to a particular embodiment, the method is implemented on a decoding terminal. In this particular case, the terminal uses the MPD file in order to know the URLs for accessing the segments of the different representations available. For a given segment, the terminal downloads, from at least two representations, the data of the segment enabling it to select a set of tiles. For example, the terminal can download, using a "byte-range" request, the SIDX (Segment Index), SSIX (SubSegment IndeX), PPS (Picture Parameter Set), SPS (Segment Parameter Set) and SEI (Supplemental Enhancement Information) in order to know the arrangement of the tiles in the image and the location of the data corresponding to these tiles in the segment. The terminal then has the information necessary to the execution of the steps 305 and 306 described with reference to FIG. 3.

Figure 5:
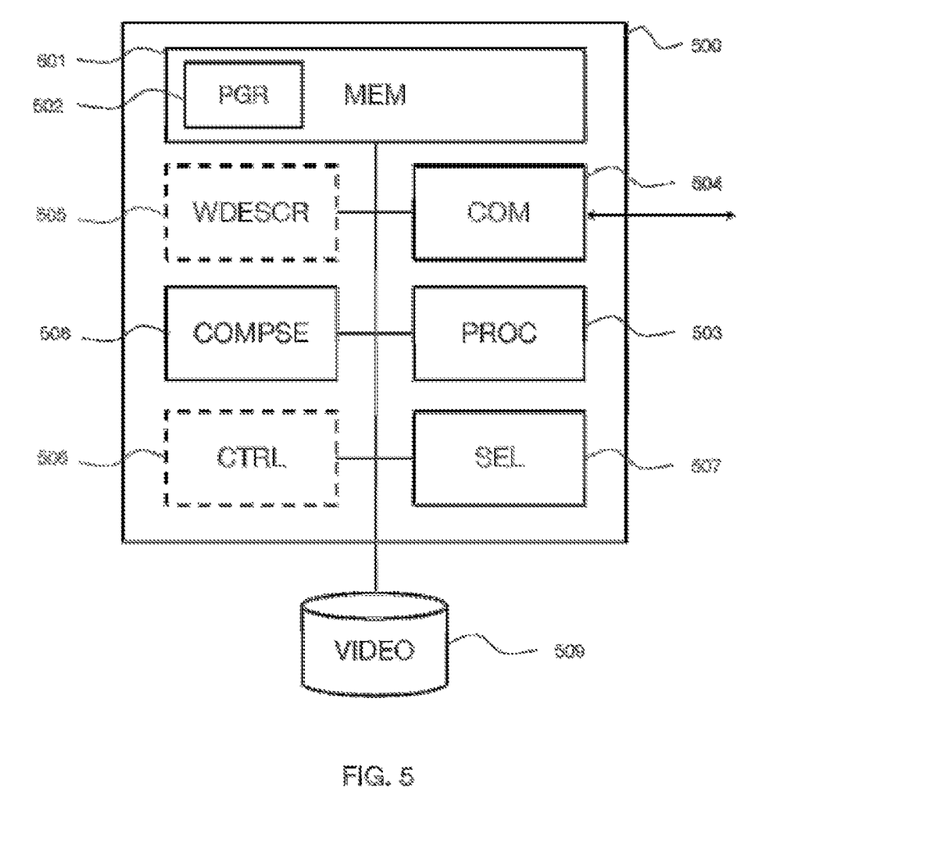
FIG. 5 illustrates the architecture of a device suitable for implementing the composition method according to a particular embodiment.

FIG. 5 illustrates a device 500 implementing the composition method, according to a particular embodiment of the invention. The device comprises a storage space 501, for example a memory MEM, a processing unit 503 equipped, for example, with a processor PROC. The processing unit can be driven by a program 502, for example a computer program PGR, implementing the method for composing an intermediate representation as described in the invention with reference to FIG. 3, and in particular the steps of obtaining of a context datum representative of the activity of viewers situated in proximity to the playback device, of selection, according to the context datum obtained and at least one criterion of maximum bit rate of the resulting intermediate representation of the composition, of a set of tiles forming a partition of the sequence and made up of tiles originating from the at least two representations, and of composition of an intermediate representation of the video sequence from the compressed data of the selected set of tiles.

On initialization, the instructions of the computer program 502 are, for example, loaded into a RAM (Random Access Memory) memory before being executed by the processor of the processing unit 503. The processor of the processing unit 503 implements the steps of the composition method according to the instructions of the computer program 502.

To this end, the device comprises, in addition to the memory 501, communication means 504 (COM) allowing the device to connect to a telecommunication network and to exchange data with other devices via the telecommunication network, and for example to receive requests to download a manifest file or at least a part of a representation of video content. These communication means can for example be a network interface and can also be used to transmit a manifest file comprising an indication representative of a capacity of the device to compose an intermediate representation of a video sequence and/or at least a part of a representation of video content. The communication means can also be used to obtain a context datum representative of the activity of viewers situated in proximity to the playback terminal on which the video sequence is played back. The device also comprises a unit 507 for selecting, according to context datum obtained and at least one criterion maximum bit rate of the intermediate representation resulting from the composition, a set of tiles forming a partition of the sequence and made up of tiles originating from the at least two representations, and a unit 508 for composing an intermediate representation of the video sequence from the compressed data of the selected set of tiles. According to a particular embodiment, the device can also comprise a unit 505 (WDESCR) for generating an indication representative of a capacity to compose an intermediate representation of a video sequence and a unit 506 (CTRL) for computing the resulting bit rate of the intermediate representation and for checking that the resulting bit rate is below a predetermined threshold. According to another embodiment, the device can comprise a database 509 for storing intermediate representations in the form of a description of the assembly of tiles and of the pre-encoded representations from which they are derived.

According to a particular embodiment, the device can be incorporated in a server, such as, for example, a video broadcast server.

Figure 6:
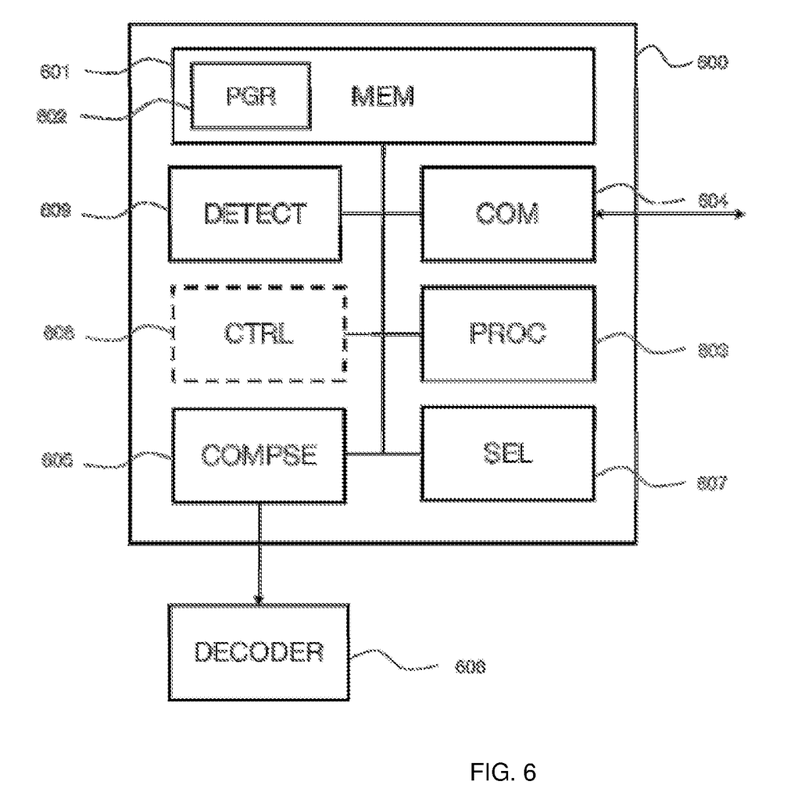
FIG. 6 illustrates the architecture of a device suitable for implementing the composition method according to another particular embodiment.

FIG. 6 illustrates another device 600 implementing the composition method according to a particular embodiment of the invention suitable for use in a video decoding terminal. The device comprises a storage space 601, for example a memory MEM, a processing unit 603 equipped, for example, with a processor PROC. The processing unit can be driven by a program 602, for example a computer program PGR, implementing the method for composing an intermediate representation as described in the invention, and in particular the steps of obtaining of a context datum representative of the activity of viewers situated in proximity to the playback device, of selection, according to to contextual data obtained and at least one criterion of maximum bit rate for the intermediate representation resulting from the composition, of a set of tiles forming a partition of the sequence and made up of tiles originating from the at least two representations, and of composition of an intermediate representation of the video sequence from the compressed data of the selected set of tiles.

On initialization, the instructions of the computer program 602 are for example loaded into a RAM (Random Access Memory) memory before being executed by the processor of the processing unit 603. The processor of the processing unit 603 implements the steps of the composition method according to the instructions of the computer program 602.

To this end, the device comprises, in addition to the memory 601, communication means 604 (COM) allowing the device to connect to a telecommunication network and to exchange data with other devices via the telecommunication network. These communication means can for example be a network interface and can be used to download at least a part of a representation of video content such as, for example, encoding parameters such as SIDX, SSIX, SPS, PPS and SEI data in the case of content encoded according to the HEVC standard, or else the data corresponding to tiles originating from different representations. The device also comprises a unit 609 for detecting a video sequence viewing context. It can be a sensor DETECT configured to capture images of the environment in proximity to the device and to detect the arrival and/or the departure of viewers in proximity to the device. The unit DETECT is also configured to track the gaze of at least one viewer detected and to determine a location on the screen of a playback device. The sensor DETECT can for example be a camera or an infrared camera associated with a processing unit comprising a processor and a memory, the processor being driven by a computer program configured to detect, in the captured images, the presence or the absence of faces and the direction of the gaze of the detected faces. The device also comprises a unit 607 (SELECT) for selecting, according to at least one selection criterion, a set of tiles forming a partition of the sequence and made up of tiles originating from the at least two representations, and a unit 605 (COMPOSE) for composing an intermediate representation of the video sequence from the compressed data of the selected set of tiles, suitable for reconstructing a video stream according to the coding standard and for transmitting this stream to a video decoder 608. According to a particular embodiment, the device can also comprise a unit 606 (CTRL) for estimating the bandwidth available, for computing the resulting bit rate of a composed intermediate representation and for checking that the resulting bit rate is below a predetermined threshold.

According to a particular embodiment, the device can be incorporated in a video decoding terminal of cellphone, set-top box, video decoder or connected television type, or else, for example, in a personal computer.

Figure 7:
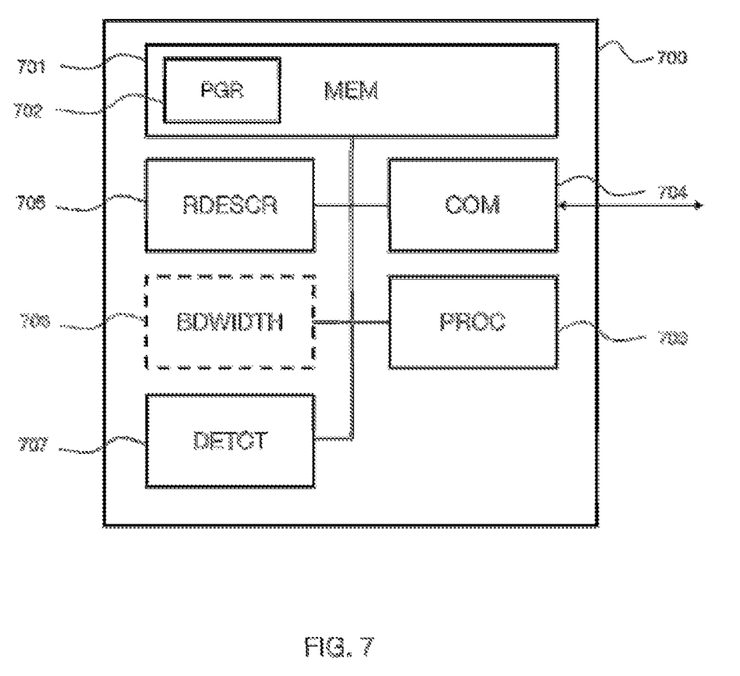
FIG. 7 illustrates the architecture of a device suitable for implementing the method for downloading a representation according to a particular embodiment.

FIG. 7 illustrates a device 700 implementing the method for downloading an intermediate representation according to a particular embodiment. The device comprises a storage space 701, for example a memory MEM, a processing unit 703 equipped, for example, with a processor PROC. The processing unit can be driven by a program 702, for example a computer program PGR, implementing the method for downloading an intermediate representation as described in the invention, and in particular the steps of reading an indication representative of the capacity of a server to compose an intermediate representation of a video sequence, of determination of a context datum representative of the activity of viewers situated in proximity to the playback device, of transmitting a tile selection criterion, and of receiving an intermediate representation composed according to the selection criterion transmitted.

On initialization, the instructions of the computer program 702 are for example loaded into a RAM (Random Access Memory) memory before being executed by the processor of the processing unit 703. The processor of the processing unit 703 implements the steps of the downloading method according to the instructions of the computer program 702.

To this end, the device comprises, in addition to the memory 701, communication means 704 (COM) allowing the device to connect to a telecommunication network and to exchange data with other devices via the telecommunication network. These communication means can for example be a network interface and can be used to obtain an indication representative of a capacity of the device to compose an intermediate representation of a video sequence by downloading, for example, a manifest file comprising such an indication. The communication means 704 can also be used to transmit a tile selection criterion to a video broadcast server suitable for composing an intermediate representation according to the present invention and receiving an intermediate representation composed according to the criterion transmitted. The device also comprises a unit 707 for detecting a video sequence viewing context. It can be a sensor DETECT configured to capture images of the environment in proximity to the device and to detect the arrival and/or the departure of viewers in proximity to the device. The unit DETECT is also configured to track the gaze of at least one viewer detected and to determine a location on the screen of a playback device. The sensor DETECT can for example be a camera or an infrared camera associated with a processing unit comprising a processor and a memory, the processor being driven by a computer program configured to detect, in the captured images, the presence or the absence of faces and the direction of the gaze of the detected faces. According to a particular embodiment, the device comprises a unit 706 (BANDWIDTH) suitable for estimating the bandwidth available for receiving a video stream. It can for example be a unit for monitoring the level of filling of a buffer memory of a video decoder.

According to a particular embodiment, the device can be incorporated in a video decoding terminal of cellphone, set-top box, video decoder or connected television type, or else, for example, in a personal computer.

The invention claimed is:

1. A method comprising:
    composing, by a composing device, an intermediate representation of a video sequence from at least two different representations of quality of said video sequence, said at least two representations being spatially partitioned into a plurality of tiles, each tile being associated with compressed data in said representation, and wherein the tiles can be decoded independently of one another and, at a given instant, the different representations are partitioned identically, wherein the composing comprises the following acts performed by the composing device:
    obtaining a context datum representative of activity of at least one viewer situated in proximity to a playback device, the context datum comprising an indication relating to a location on an image of the video sequence, the location corresponding to a zone of a screen of the playback device observed by the at least one viewer,
    selecting, according to the context datum obtained and at least one criterion of maximum bit rate of the intermediate representation resulting from the composition, a set of tiles forming a partition of the sequence from the at least two representations, and wherein the selecting comprises selecting at least one tile in a first of the at least two representations having a higher quality for a part of the image corresponding to the indicated location and selecting at least one tile in a second of the at least two representations having a lower quality for a part of the image outside the indicated location, and
    composing the intermediate representation of the video sequence from the compressed data associated with the selected set of tiles so that the intermediate representation has a quality between that of the first representation and the second representation.

2. The method as claimed in claim 1, wherein the composing further comprises: computing a resulting bit rate of the intermediate representation, checking that the resulting bit rate does not exceed a predetermined threshold, and selecting a new set of tiles when the resulting bit rate is above the predetermined threshold.

3. The method as claimed in claim 1, wherein the selecting act comprises selecting tiles in the representation of highest quality for a central part of the image.

4. The method as claimed in claim 1, further comprising obtaining a further the context datum which comprises an indication relating to the fact that no viewer is in proximity to the playback device, and wherein the selecting act comprises further selecting a minimum of tiles in the representation of highest quality in response to the further context datum.

5. A device comprising:
a processor; and
a non-transitory computer-readable medium comprising instructions stored thereon, which when executed by the processor configure the device to perform acts comprising:
composing an intermediate representation of a video sequence from at least two different representations of quality of said video sequence, said at least two representations being spatially partitioned into a plurality of tiles, each tile being associated with compressed data in said representation, and wherein the tiles can be decoded independently of one another and, at a given instant, the different representations are partitioned identically, wherein composing comprises:
obtaining a context datum representative of activity of at least one viewer situated in proximity to playback device, the context datum comprising an indication relating to a location on an image of the video sequence, the location corresponding to a zone of a screen of the playback device observed by the at least one viewer,
selecting, according to the context datum obtained and at least one criterion of maximum bit rate of the intermediate representation resulting from the composition, a set of tiles forming a partition of the sequence, from the at least two representations, and wherein the selecting comprises selecting at least one tile in a first of the at least two representations having a higher quality for a part of the image corresponding to the indicated location and selecting at least one tile in a second of the at least two representations having a lower quality for a part of the image outside the indicated location, and
composing an intermediate representation of the video sequence from the compressed data associated with the selected set of tiles so that the intermediate representation has a quality between that of the first representation and the second representation.

6. A server comprising the device for composing an intermediate representation of a video sequence as claimed in claim 5.

7. A terminal comprising the device for composing an intermediate representation of a video sequence as claimed in claim 5.

8. A non-transitory computer-readable medium comprising instructions stored thereon, which when executed by a processor of a composing device configure the composing device to perform acts comprising:
composing an intermediate representation of a video sequence from at least two different representations of quality of said video sequence, said at least two representations being spatially partitioned into a plurality of tiles, each tile being associated with compressed data in said representation, and wherein the tiles can be decoded independently of one another and, at a given instant, the different representations are partitioned identically, wherein composing comprises:
obtaining a context datum representative of activity of at least one viewer situated in proximity to playback device, the context datum comprising an indication relating to a location on an image of the video sequence, the location corresponding to a zone of a screen of the playback device observed by the at least one viewer,
selecting, according to the context datum obtained and at least one criterion of maximum bit rate of the intermediate representation resulting from the composition, a set of tiles forming a partition of the sequence, from the at least two representations, and wherein the selecting comprises selecting at least one tile in a first of the at least two representations having a higher quality for a part of the image corresponding to the indicated location and selecting at least one tile in a second of the at least two representations having a lower quality for a part of the image outside the indicated location, and
composing an intermediate representation of the video sequence from the compressed data associated with the selected set of tiles so that the intermediate representation has a quality between that of the first representation and the second representation.

* * * * *